United States Patent
Zhao

(10) Patent No.: US 10,440,321 B2
(45) Date of Patent: Oct. 8, 2019

(54) VIDEO PROCESSING METHOD AND SYSTEM BASED ON CAR-HAILING ORDER

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/816,003

(22) Filed: Nov. 17, 2017

(65) Prior Publication Data

US 2018/0139410 A1  May 17, 2018

(30) Foreign Application Priority Data

Nov. 17, 2016 (CN) .......................... 2016 1 1023939

(51) Int. Cl.
  *H04N 7/14* (2006.01)
  *H04L 29/06* (2006.01)
  *H04N 7/18* (2006.01)
  *H04L 29/08* (2006.01)

(52) U.S. Cl.
  CPC ......... *H04N 7/147* (2013.01); *H04L 65/1069* (2013.01); *H04L 65/403* (2013.01); *H04L 67/12* (2013.01); *H04N 7/183* (2013.01); *H04L 67/02* (2013.01)

(58) Field of Classification Search
  None
  See application file for complete search history.

(56) References Cited

U.S. PATENT DOCUMENTS

| 6,356,838 B1* | 3/2002 | Paul .................. G01C 21/3453 701/410 |
| 2016/0027079 A1* | 1/2016 | Schoeffler .......... G06Q 30/0609 705/325 |
| 2017/0127215 A1* | 5/2017 | Khan ..................... H04W 12/08 |
| 2017/0186054 A1* | 6/2017 | Fish ................... G06Q 30/0282 |
| 2018/0025407 A1* | 1/2018 | Zhang .................. G06Q 10/02 705/26.81 |
| 2018/0025408 A1* | 1/2018 | Xu ........................ G06Q 50/30 705/26.81 |
| 2018/0204157 A1* | 7/2018 | Li .................... G06Q 10/06311 |

FOREIGN PATENT DOCUMENTS

| CN | 103391376 A | 11/2013 |
| CN | 103971508 A | 8/2014 |
| CN | 104282141 A | 1/2015 |
| CN | 104794884 A | 7/2015 |
| CN | 105187504 A | 12/2015 |
| CN | 105338054 A | 2/2016 |
| CN | 105976602 A | 9/2016 |

OTHER PUBLICATIONS

First Office Action dated Jan. 2, 2019 corresponding to Chinese application No. 201611023939.5.

* cited by examiner

*Primary Examiner* — Quoc D Tran
(74) *Attorney, Agent, or Firm* — Nath, Goldberg & Meyer; Joshua B. Goldberg; Daniel Bissing

(57) ABSTRACT

The present application discloses a video processing method and system based on car-hailing order. The method comprises: a driver terminal confirming acceptance of the car-hailing order; the driver terminal receiving a video connection request initiated by a user terminal corresponding to the car-hailing order; and the driver terminal providing real-time video information to the user terminal.

17 Claims, 10 Drawing Sheets

103

103

102

VIDEO PROCESSING METHOD AND SYSTEM BASED ON CAR-HAILING ORDER

CROSS-REFERENCE TO RELATED APPLICATION

The present application claims priority to Chinese Patent Application No. 201611023939.5 filed on Nov. 17, 2016, the disclosure of which is hereby incorporated by reference in its entirety.

TECHNICAL FIELD

The present disclosure relates to the field of mobile internet technology, more particularly, to a method, a device, a server and a system for processing video based on car-hailing order.

BACKGROUND

Currently, if a user wants to take a taxi, he/she may hail a taxi online by using a car-hailing application to deliver a car-hailing order to a driver terminal via a car-hailing service platform. For the present, while a user can acquire information about the car number and the contact information of the driver who accepts the order, he/she cannot know in real-time the circumstances around or inside the car, for example, whether the roads around the car are congested, what buildings there are around the car, whether there are other passengers in the car (i.e., whether the previous order is completed), etc.

SUMMARY

The present disclosure provides a method, a device, a server and a system for processing video based on car-hailing order, in which real-time video information is provided to a user terminal from a driver terminal by way of establishing video connection with the user terminal.

According to an aspect of the present disclosure, a video processing method based on car-hailing order is provided, which comprises: confirming, by a driver terminal, acceptance of the car-hailing order; receiving, by the driver terminal, a video connection request initiated by a user terminal corresponding to the car-hailing order; and providing, by the driver terminal, real-time video information to the user terminal.

According to an embodiment of the present disclosure, the step of providing, by the driver terminal, the real-time video information to the user terminal may comprise: establishing, by the driver terminal, a video connection with the user terminal to provide real-time video information to the user terminal.

According to an embodiment of the present disclosure, the step of providing, by the driver terminal, the real-time video information to the user terminal may comprise: establishing, by the driver terminal, a video connection with a server to provide real-time video information to the user terminal via the server.

According to an embodiment of the present disclosure, prior to the step of receiving, by the driver terminal, the video connection request initiated by the user terminal, the method may further comprise: providing, by the drive terminal, a random uniform resource locator (URL) to the user terminal; and initiating, by the user terminal, the video connection request according to the random URL.

According to an embodiment of the present disclosure, prior to the step of establishing, by the driver terminal, the video connection with the user terminal, the method may further comprise: verifying whether a password for the video connection provided by the user terminal is correct, and establishing the video connection with the user terminal if the password is correct.

According to an embodiment of the present disclosure, prior to the step of establishing, by the driver terminal, the video connection with the user terminal, the method may further comprise: verifying whether an identification provided by the user terminal matches with user information in the car-hailing order, and establishing the video connection with the user terminal if the identification matches with the user information.

According to an embodiment of the present disclosure, prior to the step of establishing, by the driver terminal, the video connection with the server, the method may further comprise: verifying whether a password for the video connection provided by the user terminal is correct, and establishing the video connection with the server if the password is correct.

According to an embodiment of the present disclosure, prior to the step of establishing, by the driver terminal, the video connection with the server, the method may further comprise: verifying whether an identification provided by the user terminal matches with user information in the car-hailing order, and establishing the video connection with the server if the identification matches with the user information.

According to another aspect of the present disclosure, a video processing method based on car-hailing order is provided, which comprises: determining, by a server, that the car-hailing order comes into effect; receiving, by the server, a video connection request initiated by a user terminal corresponding to the car-hailing order; establishing, by the server or the user terminal, a video connection with a driver terminal which confirms acceptance of the car-hailing order; and providing, by the driver terminal, real-time video information to the user terminal.

According to an embodiment of the present disclosure, prior to the step of receiving, by the server, the video connection request initiated by the user terminal, the method may further comprise: providing, by the server, a random URL to the user terminal; and initiating, by the user terminal, the video connection request according to the random URL.

According to an embodiment of the present disclosure, the user terminal may establish the video connection with the driver terminal directly.

According to an embodiment of the present disclosure, the server may establish the video connection with the driver terminal, and the driver terminal may provide the real-time video information to the user terminal via the server.

According to an embodiment of the present disclosure, prior to the step of establishing the video connection with the driver terminal, the method may further comprise: verifying whether a password for the video connection provided by the user terminal is correct, and establishing the video connection with the driver terminal if the password is correct.

According to an embodiment of the present disclosure, prior to the step of establishing the video connection with the driver terminal, the method may further comprise: verifying whether an identification provided by the user terminal matches with user information in the car-hailing order, and establishing the video connection with the driver terminal if the identification matches with the user information.

According to still another aspect of the present disclosure, a video processing method based on car-hailing order is provided, which comprises: issuing, by a user terminal, the car-hailing order; receiving, by the user terminal, feedback information indicating that the car-hailing order comes into effect; initiating, by the user terminal, a video connection request to a driver terminal which confirms acceptance of the car-hailing order; and receiving, by the user terminal, real-time video information provided by the driver terminal.

According to an embodiment of the present disclosure, the video connection request comprises therein at least one of an identification of the user terminal and a password for video connection.

According to still another aspect of the present disclosure, a video processing device based on car-hailing order is provided, which comprises a storage and a processor, the storage storing program instructions, and the processor executing the program instructions to perform operations of: receiving the car-hailing order issued by a user terminal and delivered by a server; confirming acceptance of the car-hailing order; receiving a video connection request initiated by the user terminal; and providing real-time video information to the user terminal.

According to an embodiment of the present disclosure, upon receipt of the video connection request initiated by the user terminal, the processor executes the program instructions to perform an operation of: establishing a video connection with the user terminal to provide the real-time video information to the user terminal.

According to an embodiment of the present disclosure, upon receipt of the video connection request initiated by the user terminal, the processor executes the program instructions to perform an operation of: establishing a video connection with the server to provide the real-time video information to the user terminal via the server.

According to an embodiment of the present disclosure, the processor executes the program instructions to further perform an operation of: providing a random URL to the user terminal, and the user terminal initiates the video connection request according to the random URL.

According to an embodiment of the present disclosure, the processor executes the program instructions to further perform operations of: verifying whether a password for the video connection provided by the user terminal is correct, and establishing the video connection with the user terminal or the server if the password is correct.

According to an embodiment of the present disclosure, the processor executes the program instructions to further perform operations of: verifying whether an identification provided by the user terminal matches with user information in the car-hailing order, and establishing the video connection with the user terminal or the server if the identification matches with the user information.

According to an embodiment of the present disclosure, the video processing device based on car-hailing order may further comprise a video component for collecting real-time video information, and the video component is connected with the processor in a wired or wireless manner to provide collected real-time video information to the user terminal under the control of the processor.

According to still another aspect of the present disclosure, a video processing server based on car-hailing order is provided, which comprises a storage and a processor, the storage storing program instructions, and the processor executing the program instructions to perform operations of: receiving the car-hailing order issued by a user terminal; delivering the car-hailing order to one or more driver terminals; determining that one of the one or more driver terminals confirms acceptance of the car-hailing order; receiving a video connection request initiated by the user terminal; establishing a video connection with the driver terminal which confirms acceptance of the car-hailing order; and providing to the user terminal real-time video information that is provided by the driver terminal which confirms acceptance of the car-hailing order.

According to an embodiment of the present disclosure, the processor executes the program instructions to further perform operations of: verifying whether a password for the video connection provided by the user terminal is correct, and establishing the video connection with the driver terminal which confirms acceptance of the car-hailing order if the password is correct.

According to an embodiment of the present disclosure, the processor executes the program instructions to further perform operations of: verifying whether an identification provided by the user terminal matches with user information in the car-hailing order, and establishing the video connection with the driver terminal which confirms acceptance of the car-hailing order if the identification matches with the user information.

According to still another aspect of the present disclosure, a video processing device based on car-hailing order is provided, which comprises a storage and a processor, the storage storing program instructions, and the processor executing the program instructions to perform operations of: issuing the car-hailing order to a server; receiving feedback information indicating that the car-hailing order comes into effect; initiating a video connection request to a driver terminal which confirms acceptance of the car-hailing order; and receiving real-time video information provided by the driver terminal.

According to an embodiment of the present disclosure, the processor executes the program instructions to further perform an operation of: adding into the video connection request at least one of an identification and a password for video connection so as to send the video connection request to the driver terminal which confirms acceptance of the car-hailing order.

According to an embodiment of the present disclosure, the video processing device based on car-hailing order may further comprise a video component for displaying received real-time video information, and the video component is connected with the processor in a wired or wireless manner to display the received real-time video information under the control of the processor.

According to still another aspect of the present disclosure, a system for processing video based on car-hailing order is provided, which comprises a user terminal, a server and a driver terminal. The user terminal issues the car-hailing order to the server. The server delivers the car-hailing order to the driver terminal upon receipt of the car-hailing order issued by the user terminal. The driver terminal receives the car-hailing order and confirm acceptance of the car-hailing order. The server determines that the car-hailing order comes into effect. The user terminal initiates a video connection request after the car-hailing order comes into effect. The server receives the video connection request initiated by the user terminal and establishes the video connection with the driver terminal, and the driver terminal provides real-time video information to the user terminal via the server. Alternatively, the driver terminal receives the video connection request initiated by the user terminal, and establishes the video connection with the user terminal to provide real-time video information to the user terminal.

According to an embodiment of the present disclosure, the server or the driver terminal may provide a random URL to the user terminal, and the user terminal may initiate the video connection request according to the random URL.

According to an embodiment of the present disclosure, the video connection request initiated by the user terminal may comprise therein at least one of an identification of the user terminal and a password for the video connection.

DESCRIPTION OF THE FIGURES

In order that the technical solutions of embodiments of the present disclosure are set forth more clearly, brief descriptions on drawings of the embodiments will be given below. Obviously, the following drawings are provided merely for describing some embodiments of the present disclosure, rather than limiting a scope of the present disclosure. In the drawings.

DETAILED DESCRIPTION

In the following, the technical solutions of embodiments of the present disclosure will be described clearly and thoroughly in conjunction with the drawings. Apparently, the described embodiments are merely part of implementations of the inventive concept rather than all the embodiments. On the basis of the embodiments of the present disclosure, an ordinary person skilled in the art may further obtain, without making creative effort, other embodiments which fall into the protective scope of the present invention.

When a user hails a taxi online by using a car-hailing application (e.g., "Uber", "Didi Taxi", etc.), he/she cannot acquire image or video information concerning the circumstances around or inside the car which is driven by the driver confirming acceptance of the car-hailing order. With such information, the user submitting the car-hailing order could effectively estimate when the car accepting the car-hailing order can arrive at the origin indicated in the order.

In view of the above situation, the present disclosure provides a video processing system based on car-hailing order which comprises a user terminal, a server and a driver terminal and enables the user terminal to acquire real-time video information provided by the driver terminal.

Figure 1:
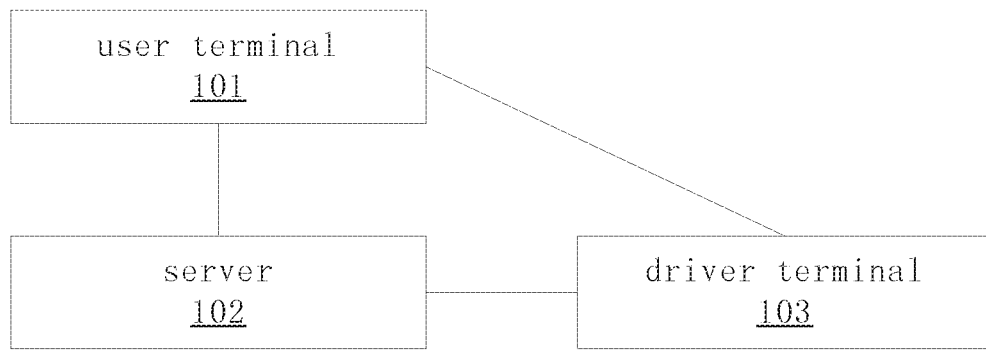
FIG. 1 is a schematic block diagram of a video processing system based on car-hailing order according to an embodiment of the present disclosure.

FIG. 1 is a schematic block diagram of a video processing system based on car-hailing orders according to an embodiment of the present disclosure.

Referring to FIG. 1, the video processing system based on car-hailing order according to the embodiment of the present disclosure may comprise a user terminal 101, a server 102 and a driver terminal 103.

The user terminal 101 issues the car-hailing order to the server 102. The server 102 delivers the car-hailing order to the driver terminal 103 after receiving the car-hailing order issued by the user terminal 101. The driver terminal 103 receives the car-hailing order and confirms acceptance of the car-hailing order, and the server 102 determines that the car-hailing order comes into effect. Thereafter, the user terminal 101 initiates a video connection request. The server 102 receives the video connection request initiated by the user terminal 101 and establishes the video connection with the driver terminal 103, and the driver terminal 103 provides real-time video information to the user terminal 101 via the server 102. According to another embodiment of the present disclosure, the driver terminal 103 receives the video connection request initiated by the user terminal 101 directly, and establishes the video connection with the user terminal 101 so as to provide the real-time video information to the user terminal 101.

According to an embodiment of the present disclosure, the user terminal 101 may include (but be not limited to) a device used by a user and having an information transmission function, such as a smartphone, a personal digital assistant (PDA), a tablet computer, a notebook PC, a carputer, a handheld game console, smart glasses, a smart watch, a wearable device, a virtual display device, a display enhanced device (e.g., Google glass, Gear VR), etc. Furthermore, the user terminal 101 may include a device for issuing a car-hailing order by the user and a video component for displaying received real-time video information. The video component may be connected to the device for issuing a car-hailing order in a wired or wireless manner.

According to an embodiment of the present disclosure, the user issuing a car-hailing order (hereinafter referred to as "order-issuing user" for short) and the user indicated in the order who is ready to take the car (hereinafter referred to as "car-taking user" for short) may be the one and the same user. Alternatively, the order-issuing user and the car-taking user may be different users. According to an embodiment of the present disclosure, the user terminal 101 may be the device used by the order-issuing user, or the device used by the car-taking user. If the order-issuing user and the car-taking user are the same user, the driver terminal 103 may provide the real-time video information to the device used by the order-issuing user. If the order-issuing user and the car-taking user are different users, the driver terminal 103 may provide the real-time video information to the device used by the car-taking user only, or to both the device used by the order-issuing user and the device used by the car-taking user, respectively.

According to an embodiment of the present disclosure, "the car-hailing order coming into effect" refers to the following situation: the user terminal 101 issues a car-hailing order to the server 102, the server 102 delivers the car-hailing order to the driver terminals) 103 of one or more drivers after receiving the car-hailing order, and if one of the one or more drivers confirm acceptance of the car-hailing order, the car-hailing order issued by the user terminal 101 comes into effect. When it is determined that the driver confirming acceptance of the car-hailing order has driven the passenger indicated in the car-hailing order to the destination, the car-hailing order is completed. The car-hailing order may include information on the origin, the destination, the contact information of the order-issuing user, the contact information of the car-taking user, and so on.

According to an embodiment of the present disclosure, "the driver terminal 103 confirming acceptance of the car-hailing order" means that the driver using the driver terminal 103 confirms acceptance of the car-hailing order and would like to provide the taxi service. Specifically, acceptance of a car-hailing order delivered by the server 102 may be confirmed by a confirmation instruction input by the driver after the driver terminal 103 receives the car-hailing order; alternatively, the acceptance of the car-hailing order may be confirmed automatically by the driver terminal 103 to cause the car-hailing order to come into effect, without an input of the driver.

According to an embodiment of the present disclosure, the driver terminal 103 may be a device used by the driver, which includes (but is not limited to) an electronic device such as a smartphone, a personal digital assistant (PDA), a tablet computer, a notebook PC, a carputer, or the like. When the driver terminal 103 confirms acceptance of the car-hailing order, information related to the driver terminal 103 (e.g., the license plate number, the model, the contact information of the driver, etc.) may be added into the car-hailing order. According to an embodiment of the present disclosure, the car-hailing order issued from the user terminal 101 to the server 102 may include the car information and the contact information corresponding to the designated driver, and so on.

According to an embodiment of the present disclosure, the video connection between the user terminal 101 and the driver terminal 103 may be achieved in at least the following two manners: in one manner, the user terminal 101 initiates a video connection request directly to the driver terminal 103, and establishes the video connection with the driver terminal 103 directly so as to acquire the real-time video information provided by the driver terminal 103, that is to say, the user terminal 101 and the driver terminal 103 communicate and exchange information with each other directly; in the other manner, the user terminal 101 initiates a video connection request to the driver terminal 103 via the server 102, the server 102 establishes the video connection with the driver terminal 103, and forwards the real-time video information provided by the driver terminal 103, that is to say, the user terminal 101 and the driver terminal 103 communicate and exchange information with each other via the server 102.

According to an embodiment of the present disclosure, the server 102 refers to a managing system and a relevant back-end server corresponding to the car-hailing application (e.g., "Uber", "Didi taxi", etc.). The managing system provides the car-hailing service to the car-taking user according to the car-hailing order submitted by the user terminal 101. The back-end server may be a duster of servers. Upon receipt of a car-hailing order submitted by the user terminal 101, the server 102 may deliver the order to a plurality of driver terminals 103. If one of the driver terminals 103 confirms acceptance of the car-hailing order, the car-hailing order comes into effect. According to an embodiment of the present disclosure, upon receipt of a car-hailing order containing a designated driver submitted by the user terminal 101, the server 102 may deliver the order to the driver terminal 103 used by the designated driver. If the driver terminal 103 used by the designated driver confirms acceptance the car-hailing order, the car-hailing order comes into effect.

According to an embodiment of the present disclosure, the driver terminal 103, which may be, for example, a smartphone used by a driver, may have both the function of receiving the car-hailing order delivered by the server 102 and the function of providing the real-time video information. According to another embodiment of the present disclosure, the driver terminal 103 may include, for example, a mobile phone for receiving the car-hailing order by the driver, and a video component for acquiring the real-time video information, including (but not limited to) a driving recorder, a car camera, and so on. The video component may be connected to the mobile phone for receiving the car-hailing order by the driver in a wired or wireless manner, and provide the acquired real-time video information to the server 102 via the mobile phone of the driver, or to the user terminal 101 directly.

Next, video processing methods based on car-hailing order according to embodiments of the disclosure may be described in detail with reference to FIGS. 2 to 9.

Figure 2:
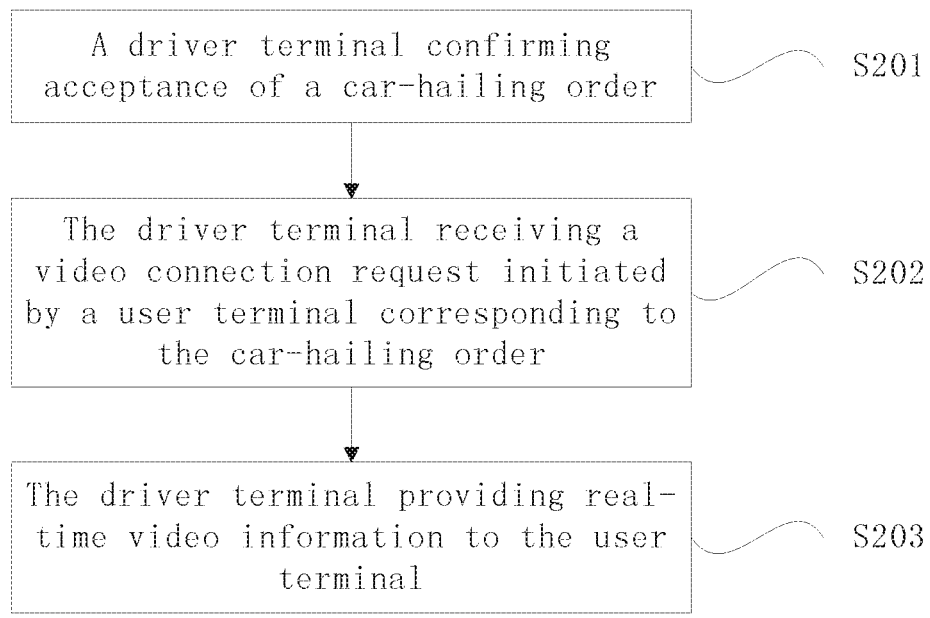
FIG. 2 is a schematic flow chart of a video processing method based on car-hailing order according to an embodiment of the present disclosure.

FIG. 2 is a schematic flow chart of a video processing method based on car-hailing order according to an embodiment of the present disclosure.

Referring to FIG. 2, a video processing method based on car-hailing order according to an embodiment of the present disclosure may include the following steps 201 to 203.

S201: confirming, by a driver terminal, acceptance of a car-hailing order.

In this step, according to an order delivering rule preset in the car-hailing service platform (e.g., the distance from the passenger), the driver terminal may receive the car-hailing order delivered by the server of the car-hailing service platform.

Upon receipt of the car-hailing order issued by a user terminal, the car-hailing service platform delivers the car-hailing order to one or more driver terminals in a certain period of time according to information on the origin, the destination, and so on in the order, and the one or more driver terminals may receive the car-hailing order delivered by the car-hailing service platform.

If a specific driver terminal confirms acceptance of the car-hailing order delivered by the car-hailing service platform, it may mean that this driver confirms that he/she would provide the car-hailing service required by the car-hailing order, that is, the car-hailing order comes into effect. The car-hailing order may include therein not only the information on the origin, the destination, and so on, but also the information on the car-taking user and/or the order-issuing user.

According to an embodiment of the present disclosure, the driver may confirm acceptance of the car-hailing order by inputting a confirmation instruction. Alternatively, a response of confirming acceptance of the car-hailing order may be returned automatically by the driver terminal, without an input of the driver.

According to another embodiment of the present disclosure, a car-hailing order may be considered as coming into effect even though the driver terminal does not make a confirmation of accepting the car-hailing order, on condition that the driver terminal, which receives the car-hailing order delivered by the server according to the information on the origin, the destination and the current geographical location of the driver terminal, is in a normal working state and is capable of maintaining communication with the server. For example, the server may deliver, according to the origin, the destination and the current geographical locations of multiple driver terminals, the car-hailing order to the nearest driver terminal to the origin. The server may also determine, according to the origin and the destination, a driver terminal whose itinerary may cover the origin and the destination, and deliver the car-hailing order to the determined driver terminal. In this case, according to prior agreement, the car-hailing order may be considered as coming into effect when the driver terminal receives the car-hailing order without the confirmation made by the driver terminal.

S202: receiving, by the driver terminal, a video connection request initiated by a user terminal corresponding to the car-hailing order.

After the order comes into effect, the driver terminal confirming acceptance of the car-hailing order becomes the car-hailing service provider corresponding to the car-hailing order.

According to an embodiment of the present disclosure, the user terminal initiating the video connection request includes at least three types of user terminals as follows: a user terminal of the order-issuing user, a user terminal of the car-taking user, and a user terminal of another user associated with the order-issuing user and/or the car-taking user, such as a user terminal of a family member or a friend of the order-issuing user and/or the car-taking user.

In the case that the order-issuing user is not the car-taking user, if it is the order-issuing user who initiates the video connection request and acquires the real-time video information provided by the driver terminal, the order-issuing user could be informed of the real-time circumstances of the car-taking user inside the car; on the other hand, if it is the car-taking user who initiates the video connection request and acquires the real-time video information provided by the driver terminal, the car-taking user could be informed of the real-time surroundings of the driver terminal, such as a landmark building and the like, so that the specific location of the driver terminal can be easily found. In the case that the order-issuing user is the car-taking user, if the order-issuing user initiates the video connection request and acquires the real-time video information provided by the driver terminal, the order-issuing user could be informed of the surroundings of the driver terminal, such as a landmark building and the like, so that the specific location of the driver terminal can be easily found. Moreover, a user terminal of another user associated with the order-issuing user and/or the car-taking user may initiate the video connection request to learn the real-time circumstances of the car-taking user inside the car.

S203: providing, by the driver terminal, real-time video information to the user terminal.

The real-time video information may be video information collected in real time by driver terminal, and may include (but be not limited to) video information inside the car driven by the driver, video information of the road conditions and environment outside the car driven by the driver, and the like. The video information may be provided to the user terminal in a wireless manner directly, or via the server.

According to an embodiment of the present disclosure, step S203 may include: establishing, by the driver terminal, the video connection with the user terminal so as to provide the real-time video information to the user terminal. Specifically, a video server may be built locally in the driver terminal. In other words, the driver terminal is used as the server for providing the video information, and the user terminal, which is a client, establishes the video connection with the driver terminal by accessing the video server built in the driver terminal, so as to acquire the real-time video information provided by the driver terminal.

According to an embodiment of the present disclosure, step S203 may include: establishing, by the driver terminal, the video connection with the server so as to provide the real-time video information to the user terminal. It should be noted that, the server in the embodiment refers to the server 102 shown in FIG. 1, that is, refers to the server accepting the car-hailing order issued by the user terminal. Referring to FIG. 1, the user terminal 101 may initiate a video connection request to the server 102, the server 102 may forward the video connection request initiated by the user terminal 101 to the driver terminal 103 so that the driver terminal 103 receives the video connection request initiated by the user terminal 101, and the server 102 establishes video connections with the user terminal 101 and the driver terminal 103, respectively, to provide the real-time video information provided by the driver terminal to the user terminal 101 in a direct-transmission manner or in a caching manner.

According to an embodiment of the present disclosure, prior to step 202, the driver terminal may provide a video address to the server, and the server forwards the video address to the user terminal. The user terminal initiates the video connection request to the driver terminal by using the received video address.

According to another embodiment of the present disclosure, prior to step 202, the server may provide a video address to the user terminal, and the user terminal initiates the video connection request to the server by using the received video address.

According to another embodiment of the present disclosure, prior to step 202, the driver terminal may provide a video address to the user terminal directly, and the user terminal initiates the video connection request to the driver terminal by using the received video address.

The video address is a network address by which the user terminal may navigate to the video information provided by the driver terminal. For example, the video address may be a uniform resource locator (URL) of the provided video information, or an address of a specific webpage which can present the video information provided by the driver terminal, or any other identification information which can be converted into a URL.

The video address may be a fixed URL or a random URL. Compared with the fixed URL, the random URL may provide higher security. According to an embodiment of the present disclosure, prior to step 202, a random URL may be provided to the user terminal so that the user terminal may initiate a video connection request according to the provided random URL. The random URL may be generated by the driver terminal and provided to the user terminal via the server, or provided to the user terminal directly by the driver terminal according to the information in the car-hailing order. Furthermore, the random URL may be generated by the server and provided to the user terminal.

According to an embodiment of the present disclosure, prior to step 203, a password for video connection provided by the user terminal may be verified, and the video connection with the user terminal may be established if the password is correct. If the password is incorrect, establishment of the video connection may be refused.

According to an embodiment of the present disclosure, the password may be verified by one of the driver terminal and the server. Moreover, according to an embodiment of the present disclosure, the password provided by the user terminal may be a video connection password sent alone, or a video connection password sent along with the video connection request.

According to an embodiment of the present disclosure, before the password for video connection provided by the user terminal is verified, a video connection password may be provided to the user terminal. The video connection password, along with the random URL, may be generated by the driver terminal or the server and is provided to the user terminal. Alternatively, the video connection password and the random URL may be generated by the driver terminal and the server, respectively, and provided to the user terminal. For example, the driver terminal generates the random URL, and provides it to the server, and the server generates the video connection password and sends it along with the random URL provided by the driver terminal to the user terminal. The video connection password may be sent to the user terminal in the form of text or image.

According to an embodiment of the present disclosure, prior to step 203, whether an identification provided by the user terminal matches with user information in the car-hailing order or not may also be verified, and the video connection with the user terminal is established if the identification matches with the user information. If they do not match with each other, establishment of the video connection may be refused. The information of identification is information which can indicate the identity of the user terminal and can be used to verify if the user terminal has a privilege of receiving the video information provided by the driver terminal. For example, the identification information may be an account of the user in the car-hailing service platform, or a mobile phone number used by the user when submitting the car-hailing order, or the like.

Similar to the verification of the video connection password, the above matching operation may be performed by one of the driver terminal and the server. Furthermore, the identification provided by the user terminal may be sent alone, or may be sent along with the video connection request.

According to an embodiment of the present disclosure, the driver terminal may send to the server the video address and the password for the video connection along with a response of confirming acceptance of the car-hailing order. According to another embodiment of the present disclosure, video addresses corresponding to specific driver terminals may be stored in the server. Upon receipt of a response of confirming acceptance of a car-hailing order from a driver terminal, the server searches for the video address corresponding to the driver terminal and generates a password for the video connection so as to send the video address and the password for the video connection to a user terminal. Moreover, an effective period of time for establishing the video connection may be set. For example, if the user terminal does not initiate a video connection request by using the video address when a predetermined period of time has elapsed after the user terminal received the video address and the password for the video connection, the password will become invalid.

According to an embodiment of the present disclosure, after the trip specified in the car-hailing order is finished, provision of video information may be stopped.

According to an embodiment of the present disclosure, after the trip specified in the car-hailing order is finished, the video address and the password for the video connection may be invalidated.

FIGS. 3 to 9 are schematic flow charts showing examples in which a user terminal, a server and a driver terminal in a video processing system based on car-hailing order interact with each other, according to embodiments of the present disclosure. In FIGS. 3 to 9, UE1 represents a user terminal, SER represents a server, and UE2, UE21 and UE22 represent driver terminals.

Figure 3:
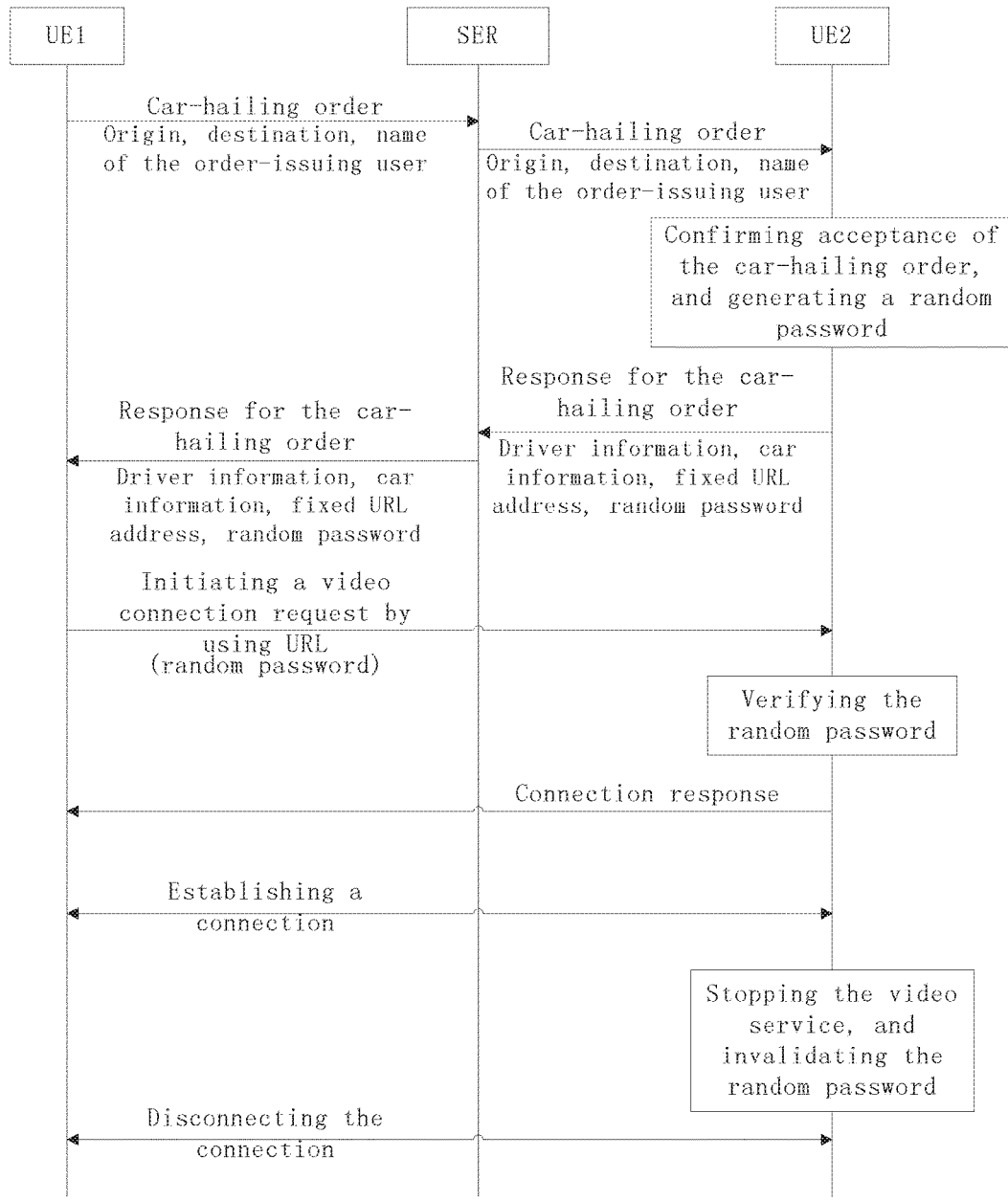
FIGS. 3 to 9 are schematic flow charts showing examples in which a user terminal, a server and a driver terminal in a video processing system based on car-hailing order interact with each other, according to embodiments of the present disclosure.

Referring to FIG. 3, UE1 sends to SER a car-hailing order which may carry information on the origin, the destination and the name of the order-issuing user (e.g., the account name of the order-issuing user). Upon receipt of the car-hailing order of UE1, SER sends to UE2 the car-hailing order which may carry the information on the origin, the destination and the name of the order-issuing user, according to the information carried in the car-hailing order. If UE2 receives the car-hailing order and confirms to provide the service (i.e., confirms acceptance of the car-hailing order), UE2 generates a random video connection password (hereinafter also referred to as a random password), and returns to SER a response for the car-hailing order, which may carry the driver information, the car information, a fixed URL address (i.e., a video address) and the generated random password. Upon receipt of the response for the car-hailing order, SER may provide to UE1 a response for the order, which may carry the driver information, the car information, the fixed URL address and the random password generated by UE2. Upon receipt of the fixed URL address and the random password, UE1 may initiate a video connection request, which carries the random password, to UE2 by using the fixed URL address. Upon receipt of the video connection request, UE2 verifies if the random password carried in the video connection request is correct, and sends a connection response to UE1 and establishes the video connection with UE1 if the random password is verified to be correct. After the destination is reached, UE2 closes the video service, invalidates the generated random password (e.g., deletes the generated random password), and disconnects the video connection to stop providing the video information.

Figure 4:
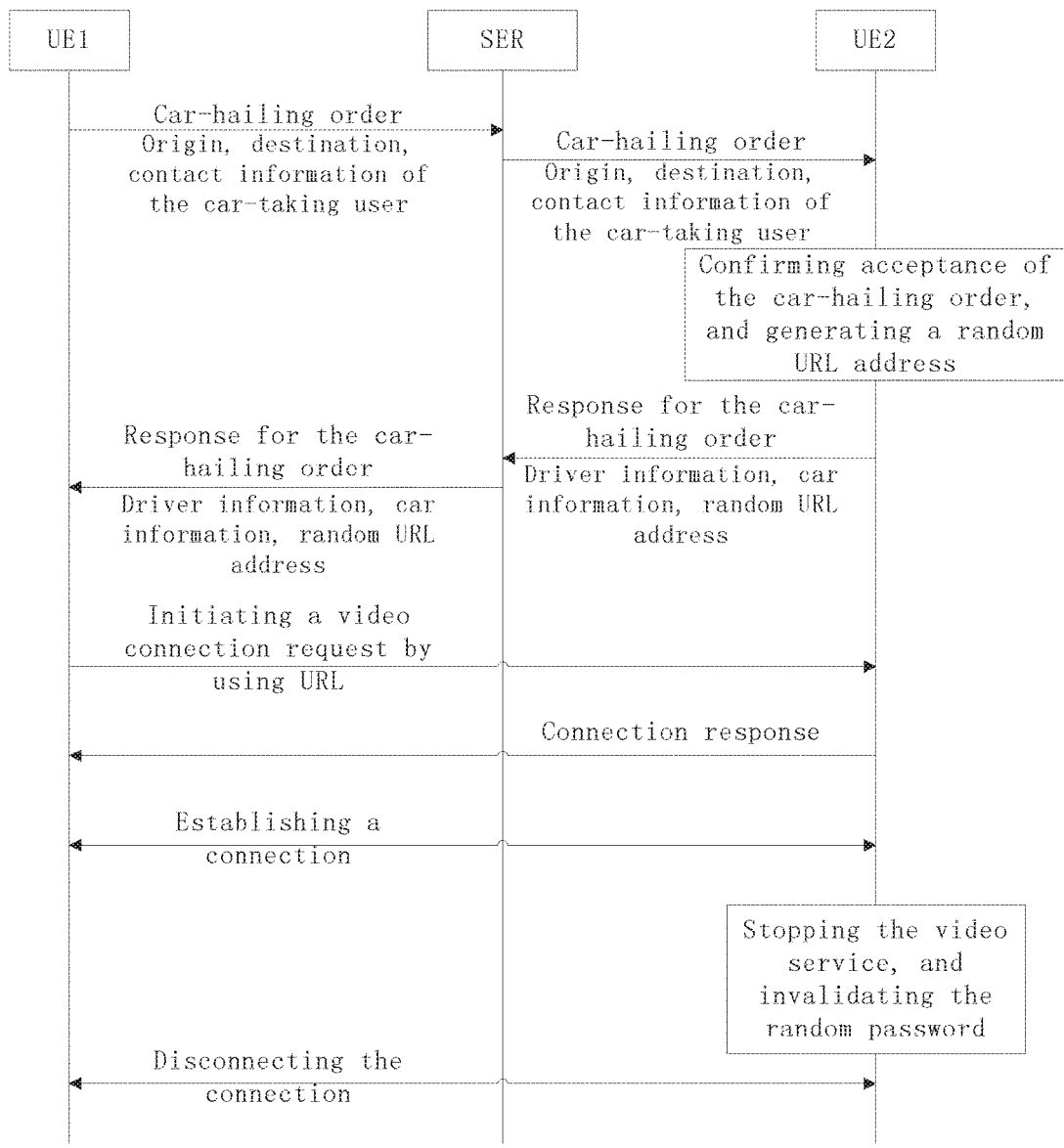

Referring to FIG. 4, different from the example shown in FIG. 3, UE1 sends to SER a car-hailing order which may carry information on the origin, the destination, the contact information of the passenger (e.g., the mobile phone number of the passenger). If UE2 receives the car-hailing order and confirms to provide the service (i.e., confirms acceptance of the car-hailing order), UE2 generates a random URL address (i.e., a video address), and returns to SER a response for the car-hailing order, which may carry the driver information, the car information and the generated random URL address. Upon receipt of the response for the car-hailing order, SER provides to UE1 a response for the order which may carry the driver information, the car information and the random URL address. UE1 may initiate a video connection request to UE2 according to the random URL address.

Figure 5:
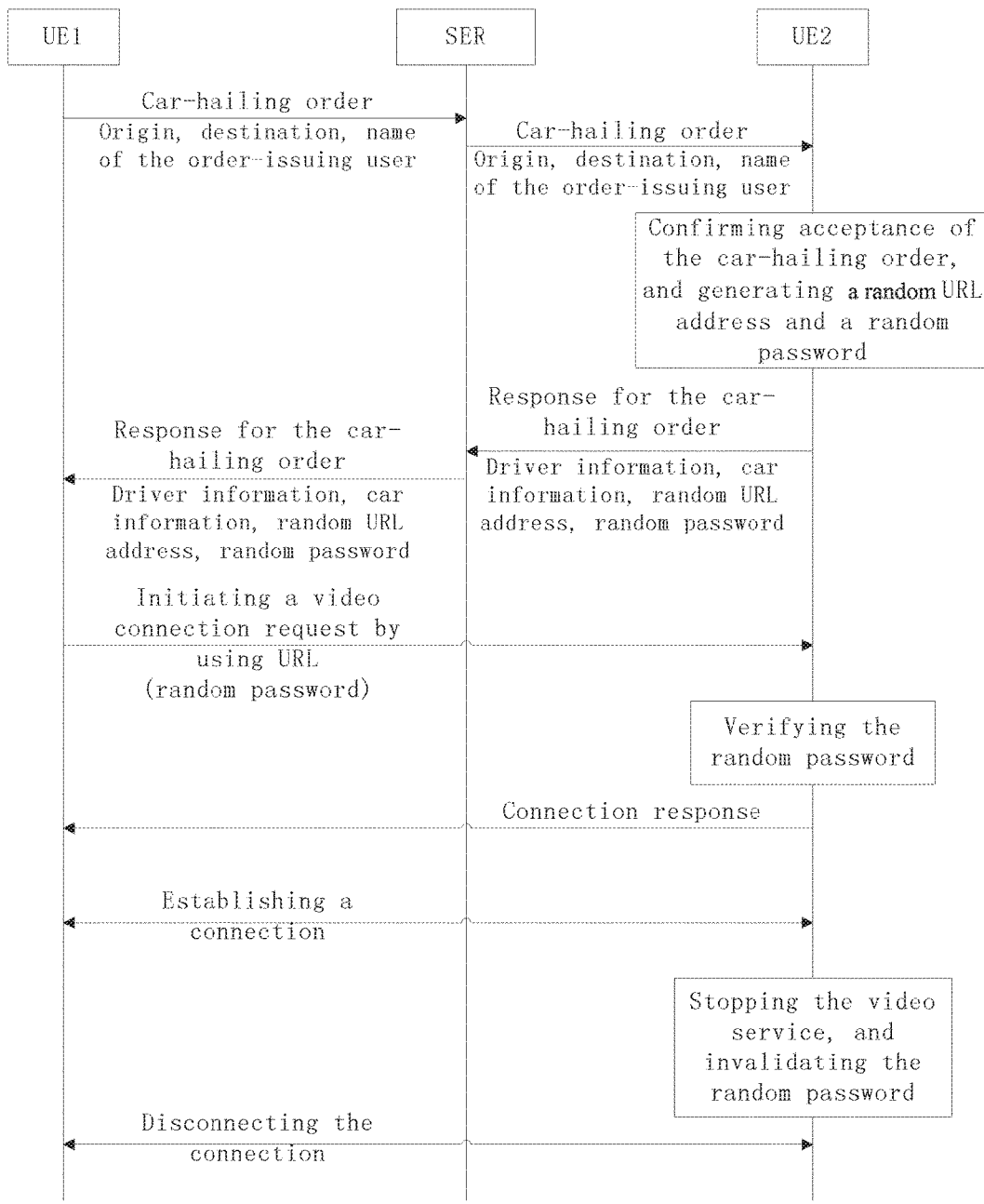

Referring to FIG. 5, different from the example shown in FIG. 3, when UE2 receives a car-hailing order and confirms to provide the service (i.e., confirms acceptance of the car-hailing order), UE2 generates a random URL address and a random password, and returns to SER a response for the car-hailing order, which may carry the driver information, the car information, the random URL address, and the random password. Upon receipt of the response for the car-hailing order, SER provides to UE1 a response for the car-hailing order, which may carry the driver information, the car information, the random URL address and the random password. Upon receipt of the random URL address and the random password, UE1 may initiate a video connection request, which carries the random password, to UE2 according to the random URL address.

Figure 6:
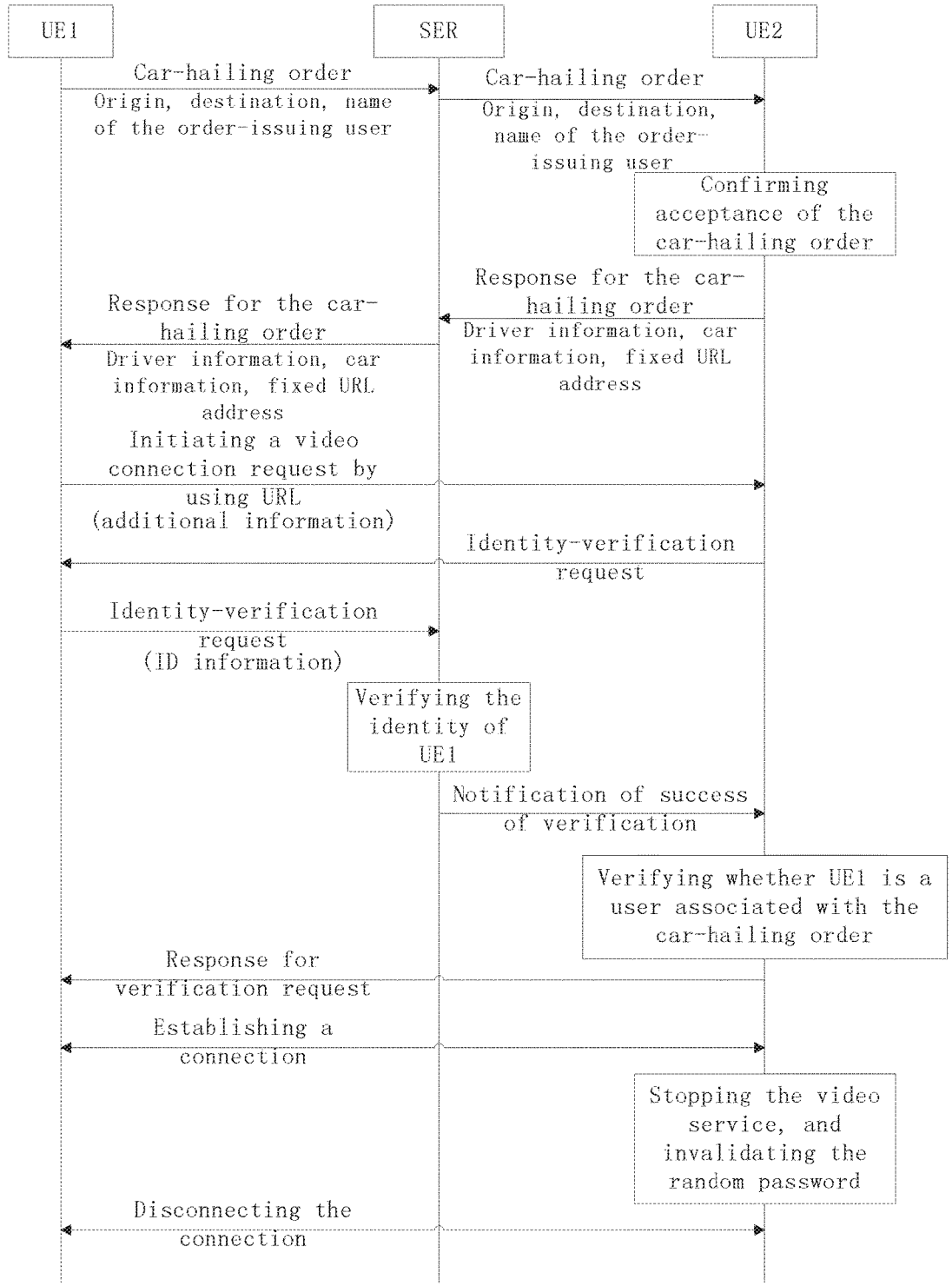

Referring to FIG. 6, different from the example shown in FIG. 3, when UE2 receives a car-hailing order and confirms to provide the service (i.e., confirms acceptance of the car-hailing order), UE2 does not generate a random password, and returns to SER a response for the car-hailing order, which may carry the driver information, the car information, and a fixed URL address (i.e., a video address). Upon receipt of the response for the car-hailing order, SER provides to UE1 a response for the order, which may carry the driver information, the car information and the fixed URL address. Upon receipt of the fixed URL address, UE1 may initiate a video connection request, which carries additional information such as order information, to UE2 by using the fixed URL address. Upon receipt of the video connection request, UE2 sends an identity-verification request to UE1. Upon receipt of the identity-verification request, UE1 sends identification information to be verified to SER. For example, UE1 is a registered user of SER. When SER verifies that UE1 is a registered user of SER, it sends a notification of success of verification to UE2. Upon receipt of the notification of success of verification sent by SER, UE2 verifies if UE1 is a user associated with the car-hailing order according to the additional information provided by UE1, and sends to UE1 a response for the identity-verification request. Upon receipt of a response for the identity-verification request which indicates success of the verification, UE1 establishes the video connection with UE2.

According to another embodiment of the present disclosure, the steps of sending the identity-verification request and verifying the identity of UE1 by SER may be omitted. UE2 may directly verify if UE1 is a user associated with the car-hailing order. According to another embodiment of the present disclosure, SER may verify if UE1 is a user associated with the car-hailing order.

According to an embodiment of the present disclosure, the driver terminal may include a plurality of devices used by the driver. One of the plurality of devices (e.g., a mobile phone used by the driver) may be configured to: receive a car-hailing order issued by the user terminal and delivered by the server; confirm acceptance of the car-hailing order; and receive a video connection request initiated by the user terminal. Another one of the plurality of devices (e.g., a camera or a driving recorder mounted on the car of the driver) may be configured to collect video information so as to provide the collected video information to the user terminal.

Figure 7:
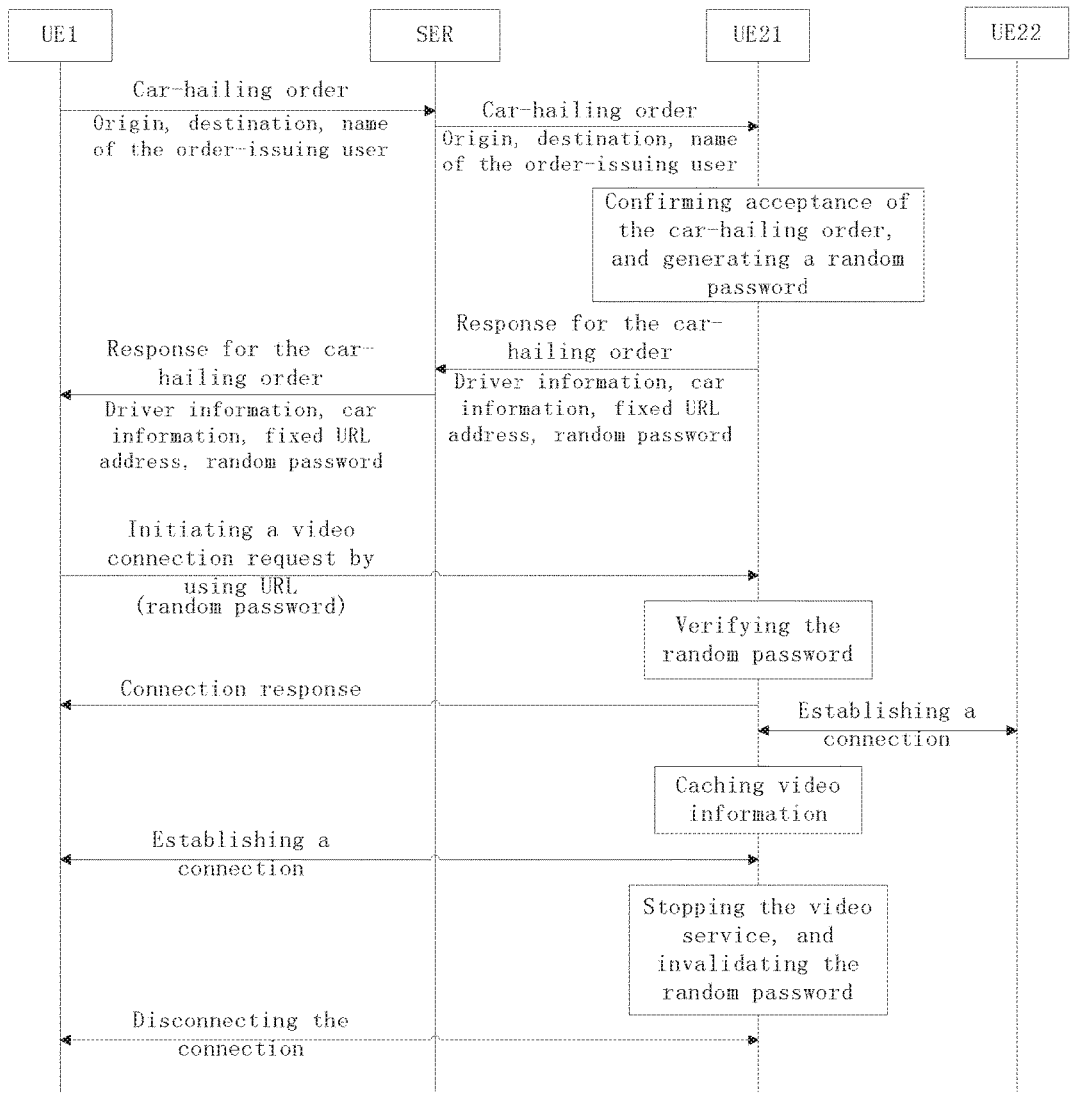

The driver terminal shown in FIG. 7 includes two devices UE21 and UE22, wherein UE21 is a device for processing the car-hailing order, and UE22 is a device for collecting the video information. As shown in FIG. 7, different from the example shown in FIG. 3, UE21 receives the car-hailing order sent by SER, generates a random password, returns to SER a response for the car-hailing order, establishes a video connection with UE22, caches video information collected by UE22, establishes a video connection with UE1, and provides to UE1 the video information collected by UE22. It should be noted that, the sequence in which the step of establishing a video connection between UE21 and UE1 and the step of establishing a video connection between UE21 and UE22 are performed is not limited to the sequence as described herein, and it is not necessary for UE21 to cache the video information collected by UE22. UE21 and UE22 may be connected in a wired or wireless manner.

According to another embodiment of the present disclosure, the video connection established between UE1 and UE21 is unnecessary, and instead, a video connection may be established directly between UE22 and UE1.

It should be noted that the driver terminals employed in the examples described with reference to FIGS. 4 to 6 each also include two devices UE21 and UE22, detailed descriptions of which will be omitted here.

Figure 8:
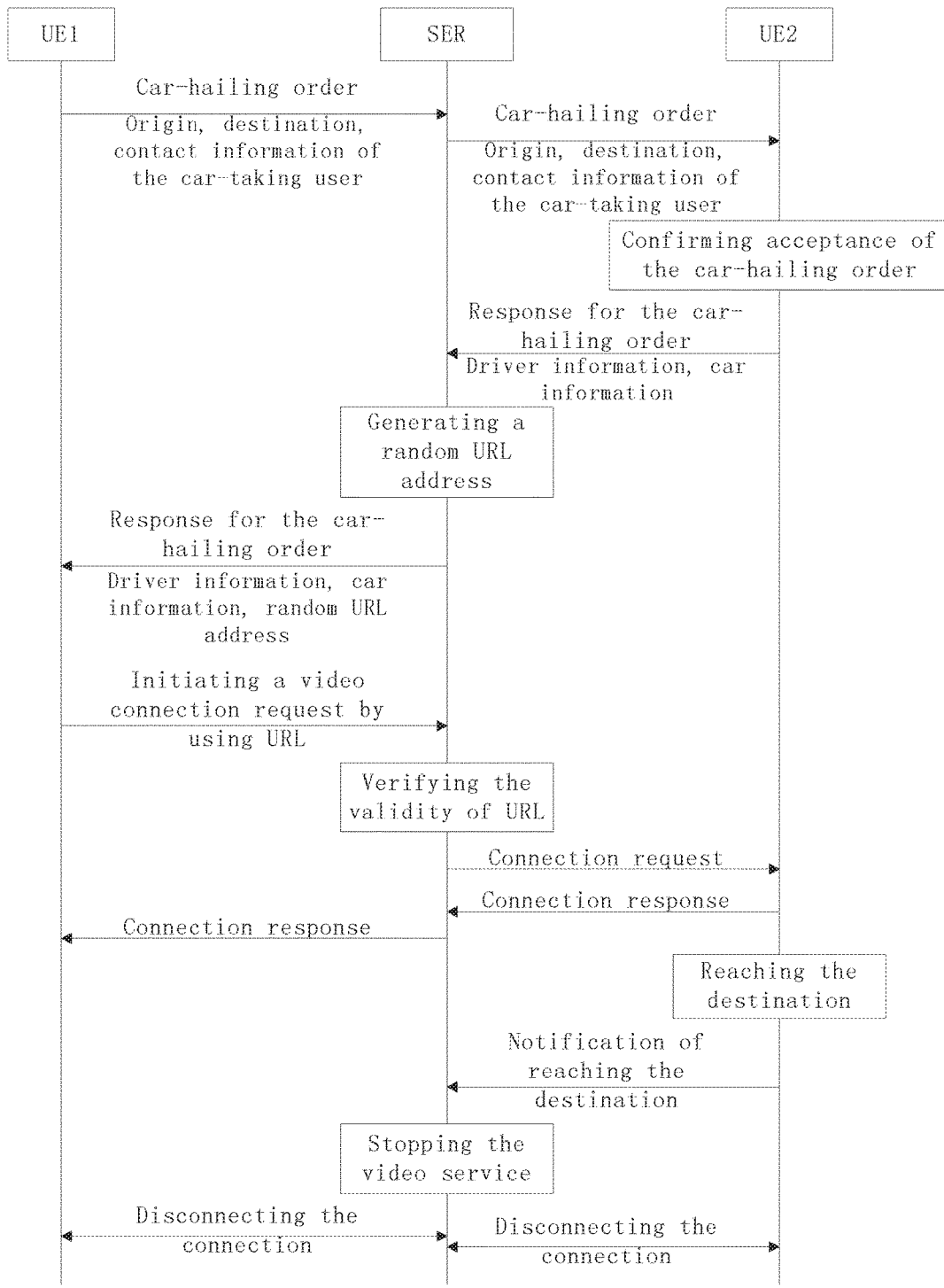

Referring to FIG. 8, different from the example shown in FIG. 4, SER is configured to generate the random URL address (i.e., the video address) which is to be provided to UE1 for initiation of a video connection request, and SER is further configured to verify if the video address (e.g., the random URL address) used to initiate the video connection request by UE1 is valid or not. Furthermore, UE1 establishes a video connection with SER, and SER establishes a video connection with UE2. UE2 provides the video information to UE2 via SER. SER may cache the video information collected by UE2 and provide the cached video information to UE1, or may forward the video information collected by UE2 to UE1 directly. It should be noted that the video address may be a fixed URL address, and SER may generate a random password and provide it to UE1 along with the video address. Moreover, verification of the validity of the video address may be omitted.

Figure 9:
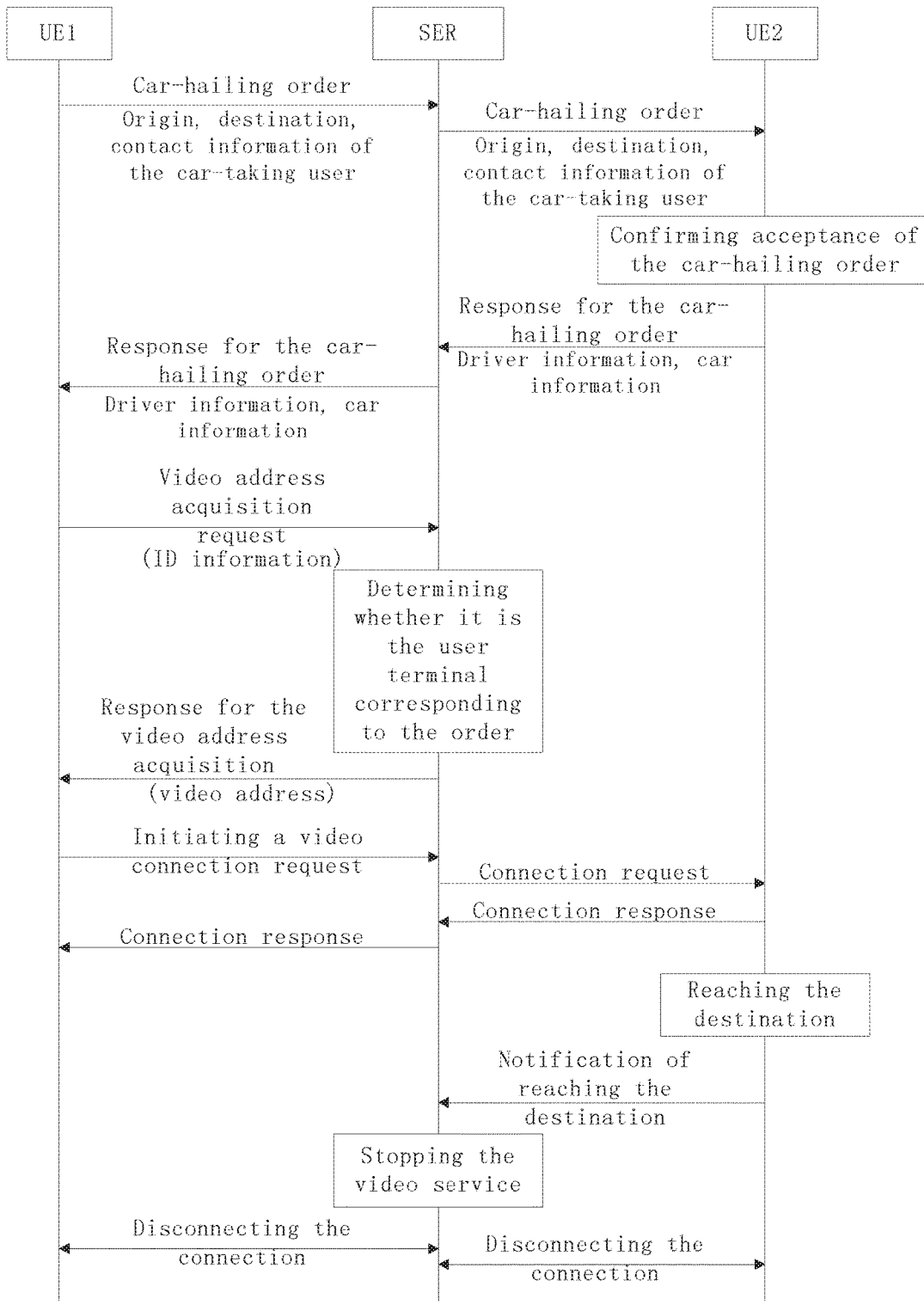

Referring to FIG. 9, different from the example shown in FIG. 8, UE1 sends a video address acquisition request to SER upon receipt of the response for the car-hailing order returned by SER. SER determines whether UE1 is the user terminal corresponding to the car-hailing order according to the identification information of UE1 (e.g., the account information of UE1) carried in the video address acquisition request. If the determination result is "YES", SER returns to UE1 a response for the acquisition in which the video address (e.g., a fixed URL address or a random URL address) is contained.

It should be noted that the sequence in which sending a video address to UE1 by SER, verifying an access privilege of UE1 (e.g., verifying a video-requesting password of UE1 or verifying identification information of UE1) by SER, establishing a video connection with UE1 by SER, establishing a video connection with UE2 by SER, and so on are performed, is not limited to the sequence as described herein.

FIGS. 10 to 14 are schematic block diagrams of a video processing device and a server based on car-hailing order according to embodiments of the present disclosure.

Figure 10:
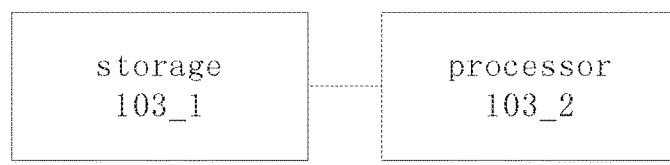
FIGS. 10 to 14 are schematic block diagrams of a video processing device and a server based on car-hailing order according to embodiments of the present disclosure.

The video processing device based on car-hailing order according to an embodiment of the present disclosure may be the driver terminal 103 shown in FIG. 1. Referring to FIGS. 1 and 10, the driver terminal 103 may include a storage 103_1 and a processor 103_2. The storage 103_1 stores program instructions. The processor 103_2 executes the program instructions to perform the following operations: receiving the car-hailing order issued by the user terminal 101 and delivered by the server 102; confirming acceptance of the car-hailing order; receiving a video connection request initiated by the user terminal 101; and providing real-time video information to the user terminal 101.

According to an embodiment of the present disclosure, upon receipt of the video connection request initiated by the user terminal 101, the processor 103_2 of the driver terminal 103 may execute the program instructions to perform the following operation: establishing a video connection with the user terminal 101 so as to provide the real-time video information to the user terminal 101.

According to an embodiment of the present disclosure, upon receipt of the video connection request initiated by the user terminal 101, the processor 103_2 of the driver terminal 103 may execute the program instructions to perform the following operation: establishing a video connection with the server 102 so as to provide the real-time video information to the user terminal 101 via the server 102.

According to an embodiment of the present disclosure, the processor 103_2 of the driver terminal 103 may execute the program instructions to further perform the following operation: providing a random URL to the user terminal 101, and then the user terminal 101 initiates a video connection request according to the random URL.

According to an embodiment of the present disclosure, the processor 103_2 of the driver terminal 103 may execute the program instructions to further perform the following operations: verifying whether a password for video connection provided by the user terminal 101 is correct, and establishing a video connection with the user terminal 101 or the server 102 if the password is correct.

According to an embodiment of the present disclosure, the processor 103_2 of the driver terminal 103 may execute the program instructions to further perform the following operations: verifying whether an identification provided by the user terminal 101 matches with user information in the car-hailing order, and establishing the video connection with the user terminal 101 or the server 102 if the identification matches with the user information.

Figure 11:
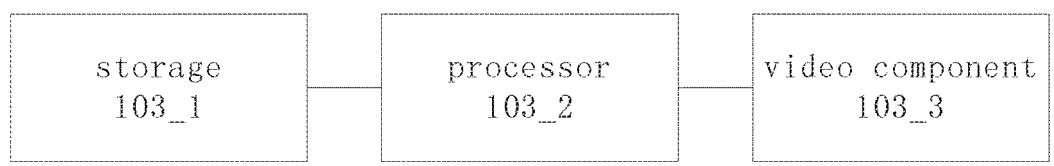

Referring to FIGS. 1 and 11, the driver terminal 103 may further include a video component 103_3 for collecting real-time video information, and the video component 103_3 may be connected to the processor 103_2 in a wired or wireless manner to provide the collected real-time video information to the user terminal 101 under the control of the processor 103_2.

Figure 12:
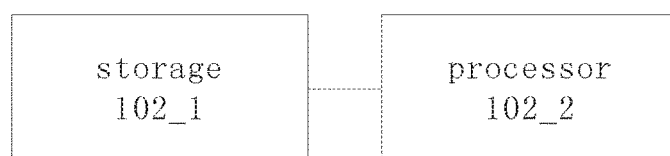

The video processing server based on car-hailing order according to an embodiment of the present disclosure may be the server 102 shown in FIG. 1. Referring to FIGS. 1 and 12, the server 102 may include a storage 102_1 and a processor 102_2. The storage 102_1 stores program instructions. The processor 102_2 executes the program instructions to perform the following operations: receiving the car-hailing order issued by the user terminal 101; delivering the car-hailing order to one or more driver terminals 103; determining whether one driver terminal 103 of the one or more driver terminals 103 confirms acceptance of the car-hailing order; receiving a video connection request initiated by the user terminal 101; establishing a video connection with the driver terminal 103 which confirms acceptance of the car-hailing order; and providing to the user terminal 101 real-time video information provided by the driver terminal 103 which confirms acceptance of the car-hailing order.

According to an embodiment of the present disclosure, the processor 102_2 of the server 102 may execute the program instructions to further perform the following operations: verifying whether a password for video connection provided by the user terminal 101 is correct, and establishing a video connection with the driver terminal 103 which confirms acceptance of the car-hailing order if the password is correct.

According to an embodiment of the present disclosure, the processor 102_2 of the server 102 may execute the program instructions to further perform the following operations: verifying whether an identification provided by the user terminal 101 matches with user information in the car-hailing order, and establishing a video connection with the driver terminal 103 which confirms acceptance of the car-hailing order if the identification matches with the user information.

Figure 13:
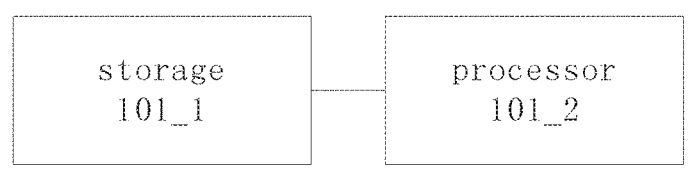

The video processing device based on car-hailing order according to an embodiment of the present disclosure may be the user terminal 101 shown in FIG. 1. Referring to FIGS. 1 and 13, the user terminal 101 may include a storage 1011 and a processor 101_2. The storage 101_1 stores program instructions. The processor 101_2 executes the program instructions to perform the following operations: issuing the car-hailing order to the server 102; receiving feedback information indicating that the car-hailing order comes into effect; initiating a video connection request to the driver terminal 103 which confirms acceptance of the car-hailing order; and receiving real-time video information provided by the driver terminal 103.

According to an embodiment of the present disclosure, the processor 101_2 of the user terminal 101 may execute the program instructions to perform the following operation: adding into the video connection request at least one of an identification and a password for video connection so as to send the video connection request to the driver terminal 103 which confirms acceptance of the car-hailing order.

Figure 14:
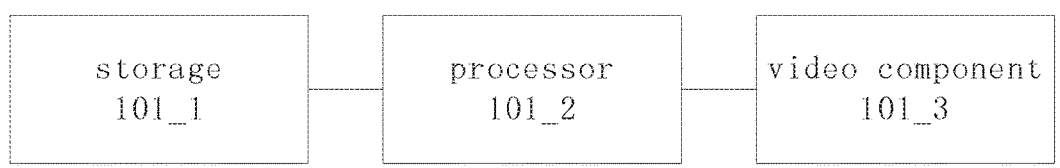

Referring to FIGS. 1 and 14, the user terminal 101 may further include a video component 101_3 for displaying received real-time video information, and the video component 101_3 may be connected to the processor 101_2 in a wired or wireless manner so as to display the received real-time video information under the control of the processor 101_2.

The foregoing are embodiments of the present disclosure only, and should not be used for limiting the scope of the present disclosure. Any modification, equivalent substitution, improvement, and so on, made within the spirit and principle of the present disclosure should be considered as falling into the protective scope of the present disclosure.

What is claimed is:

1. A video processing method based on car-hailing order, comprising:
    confirming, by a driver terminal, acceptance of a car-hailing order issued by a user terminal, generating a password for a video connection, and sending the password to the user terminal, the car-hailing order comprising an origin, a destination, contact information of an order-issuing user, and contact information of a car-taking user;
    receiving, by the driver terminal, a video connection request initiated by the user terminal corresponding to the car-hailing order before the car-taking user is picked up by a car driven by a driver;
    providing real-time video information collected by a driving recorder of the car driven by the driver to the user terminal in response to the video connection request, and
    disconnecting, by the driver terminal, the video connection, and deleting the password after the car-taking user reaches the destination.

2. The video processing method of claim 1, wherein the step of providing real-time video information collected by a driving recorder of the car driven by the driver to the user terminal in response to the video connection request, comprises:
    establishing, by the driver terminal, the video connection with the user terminal to provide the real-time video information to the user terminal.

3. The video processing method of claim 1, wherein the step of providing real-time video information collected by a driving recorder of the car driven by the driver to the user terminal in response to the video connection request comprises:
    establishing, by the driver terminal, the video connection with a server to provide the real-time video information to the user terminal via the server.

4. The video processing method of claim 2, wherein, prior to the step of establishing, by the driver terminal, the video connection with the user terminal, the method further comprises:
    verifying whether the password for the video connection provided by the user terminal is correct, and establishing the video connection with the user terminal if the password is correct.

5. The video processing method of claim 2, wherein, prior to the step of establishing, by the driver terminal, the video connection with the user terminal, the method further comprises:
verifying whether an identification provided by the user terminal matches with user information in the car-hailing order, and establishing the video connection with the user terminal if the identification matches with the user information.

6. The video processing method of claim 3, wherein, prior to the step of establishing, by the driver terminal, the video connection with the server, the method further comprises:
verifying whether the password for the video connection provided by the user terminal is correct, and establishing the video connection with the server if the password is correct.

7. The video processing method of claim 3, wherein, prior to the step of establishing, by the driver terminal, the video connection with the server, the method further comprises:
verifying whether an identification provided by the user terminal matches with user information in the car-hailing order, and establishing the video connection with the server if the identification matches with the user information.

8. A video processing method based on car-hailing order, comprising:
confirming, by a driver terminal, acceptance of a car-hailing order issued by a user terminal, generating a password for a video connection, and sending the password to the user terminal, the car-hailing order comprising an origin, a destination, contact information of an order-issuing user, and contact information of a car-taking user;
determining, by a server, that the car-hailing order comes into effect;
receiving, by the server, a video connection request initiated by a user terminal corresponding to the car-hailing order before the car-taking user is picked up by a car driven by a driver;
establishing, by the server or the user terminal, the video connection with the driver terminal which confirms acceptance of the car-hailing order;
providing real-time video information collected by a driving recorder of the car driven by the driver to the user terminal in response to the video connection request; and
disconnecting, by the driver terminal, the video connection, and deleting the password after the car-taking user reaches the destination.

9. The video processing method of claim 8, wherein the user terminal establishes the video connection with the driver terminal directly.

10. The video processing method of claim 8, wherein the server establishes the video connection with the driver terminal, and the driver terminal provides the real-time video information to the user terminal via the server.

11. The video processing method of claim 8, wherein, prior to the step of establishing the video connection with the driver terminal, the method further comprises:
verifying whether the password for the video connection provided by the user terminal is correct, and establishing the video connection with the driver terminal if the password is correct.

12. The video processing method of claim 8, wherein, prior to the step of establishing the video connection with the driver terminal, the method further comprises:
verifying whether an identification provided by the user terminal matches with user information in the car-hailing order, and establishing the video connection with the driver terminal if the identification matches with the user information.

13. A system for processing video based on car-hailing order, comprising a user terminal, a server, a driver terminal, and a driving recorder of a car driven by a driver, wherein
the user terminal is configured to issue a car-hailing order to the server, the car-hailing order comprising an origin, a destination, contact information of an order-issuing user, and contact information of a car-taking user,
the server is configured to deliver the car-hailing order to the driver terminal upon receipt of the car-hailing order issued by the user terminal,
the driver terminal is configured to receive the car-hailing order and confirm acceptance of the car-hailing order, generate a password for a video connection, and send the password to the user terminal,
the server is further configured to determine that the car-hailing order comes into effect,
the user terminal is further configured to initiate a video connection request after the car-hailing order comes into effect,
the server is further configured to receive the video connection request initiated by the user terminal and establish the video connection with the driver terminal before the car-taking user is picked up by the car driven by the driver,
the driving recorder of the car driven by the driver is further configured to provide real-time video information collected by the driving recorder to the user terminal via the server in response to the video connection request, or
the driver terminal is further configured to receive the video connection request initiated by the user terminal and establish the video connection with the user terminal, before the car-taking user is picked up by the car driven by the driver,
the driving recorder of the car driven by the driver is further configured to provide real-time video information collected by the driving recorder to the user terminal in response to the video connection request, and
the driver terminal is further configured to disconnect the video connection, and delete the password after the car-taking user reaches the destination.

14. The system of claim 13, wherein the video connection request initiated by the user terminal comprises therein at least one of an identification of the user terminal and a password for the video connection.

15. The video processing method of claim 1, wherein, prior to the step of receiving, by the driver terminal, the video connection request initiated by the user terminal, the method further comprises:
providing, by the driver terminal, a random uniform resource locator (URL) to the user terminal; and
initiating, by the user terminal, the video connection request according to the random URL.

16. The video processing method of claim 8, wherein, prior to the step of receiving, by the server, the video connection request initiated by the user terminal, the method further comprises:
providing, by the server, a random URL to the user terminal; and
initiating, by the user terminal, the video connection request according to the random URL.

17. The system of claim 13, wherein the server or the driver terminal is further configured to provide a random URL to the user terminal, and the user terminal is further configured to initiate the video connection request according to the random URL.

\* \* \* \* \*